No. 741,716. PATENTED OCT. 20, 1903.
J. P. RAY.
LOCKING DEVICE FOR WRENCHES, CLAMPS, &c.
APPLICATION FILED APR. 20, 1903.
NO MODEL.

WITNESSES:
Mary S. Tooker
Charles M. Wilson

James P. Ray INVENTOR.
BY Edward Nuggent
his ATTORNEY.

No. 741,716. Patented October 20, 1903.

UNITED STATES PATENT OFFICE.

JAMES P. RAY, OF GRAND RAPIDS, MICHIGAN.

LOCKING DEVICE FOR WRENCHES, CLAMPS, &c.

SPECIFICATION forming part of Letters Patent No. 741,716, dated October 20, 1903.

Application filed April 20, 1903. Serial No. 153,518. (No model.)

*To all whom it may concern:*

Be it known that I, JAMES P. RAY, a citizen of the United States, residing at Grand Rapids, in the county of Kent and State of Michigan, have invented new and useful Improvements in Locking Devices for Wrenches, Clamps, and Analogous Purposes, of which the following is a specification.

This invention relates to a certain new and useful locking device for wrenches, clamps, and analogous purposes; and the invention consists in the combination and arrangement of parts hereinafter described and claimed.

The objects of my invention are, first, to furnish a quick-acting clamping device for wrenches and other analogous purposes, and, second, to furnish means for very securely locking the jaw and movable part in any required position, from which position it can be readily and quickly released. These objects I accomplish by means of the mechanism illustrated in the accompanying drawings, in which—

Figure 1:
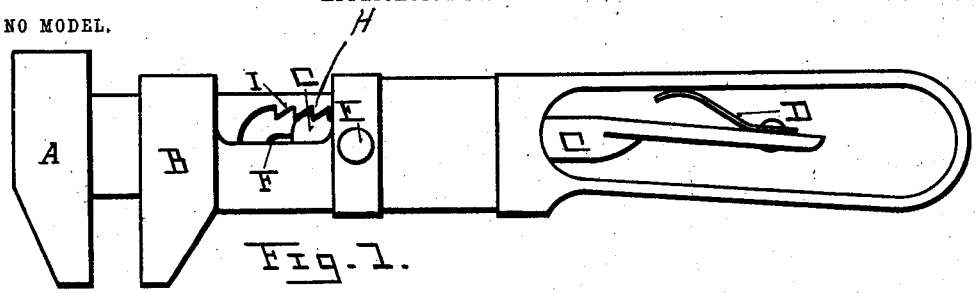
Figure 2:
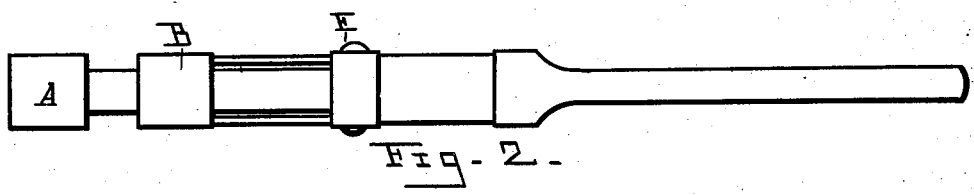
Figure 3:
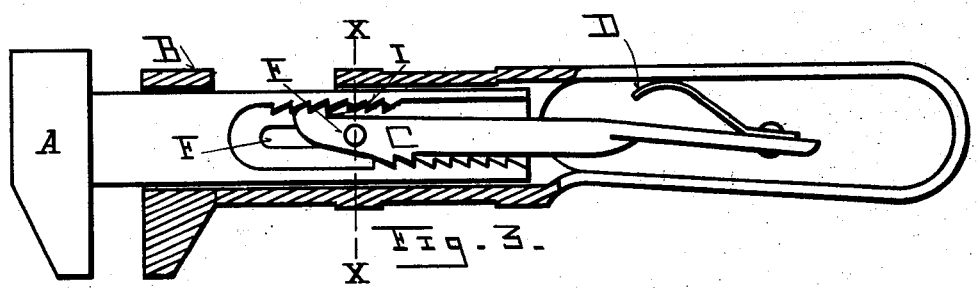
Figure 4:
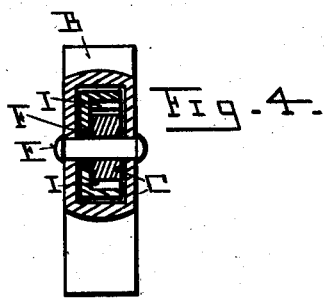

Figure 1 shows a side view of a wrench constructed in accordance with my invention, the jaws being partially opened. Fig. 2 shows a plan or top view of the same. Fig. 3 shows a side view with portions cut away in order to show the arrangement of the dog between the two racks and the method of operating the said dog. Fig. 4 shows a sectional view on the line X X of Fig. 3, also illustrating the position of the dog, the shank of the jaw, and the handle and the position of the pivot which supports the dog.

Similar letters refer to similar parts throughout the several views.

A represents the outer jaw and shank when the invention is applied to a wrench.

B shows the stationary jaw and handle.

C shows the dog, which lies between the racks with which the dog engages and which is pivoted by means of the pivot E. The dog is provided with a series of teeth on either side, as shown by I. These teeth are adapted to engage normally with the rack-teeth H.

D represents a spring adapted to engage the teeth upon the dog with the teeth upon the rack.

F represents a slot in the shank of the jaw A, the pivot E passing through this slot and serving to limit the movement of the movable jaw.

In the drawings I have shown the teeth I in engagement with the teeth H. In order to disengage the teeth, the spring end of the dog is pressed so as to contract the spring B, and the teeth on both sides of the jaw simultaneously disengage from the teeth of the two racks. The teeth both on the jaw and on the racks are inclined. Those on the jaw are inclined in one direction and those on the rack are inclined in the opposite direction, so as to cause the same to securely engage with each other. When the jaw A is drawn out and the spring D is allowed to act, it holds the teeth upon the dog securely in engagement with the teeth on the rack, and by this construction and arrangement any pressure tending to extend the movable jaw will only tighten the engagement between the rack-teeth and the teeth on the dog.

I have shown a device in an ordinary monkey-wrench and have shown my preferred form for operating the same; but it will be understood that this device may be applied in various ways without departing from the real invention.

The device may be constructed of any suitable material; but ordinarily the same will be constructed of iron or steel or some spring metal.

Having thus described my invention, what I claim to have invented, and desire to secure by Letters Patent, is—

1. In a locking device for wrenches, and analogous purposes, a pair of racks having locking-teeth, a pivoted dog having a series of locking-teeth on each side which engage simultaneously with the rack-teeth, and suitable means for simultaneously disengaging the teeth upon the dog from said rack-teeth.

2. In combination with the shank of a jaw having two series of rack-teeth, a pivoted dog lying between the said series of rack-teeth and provided with teeth on either side which engage simultaneously with said rack-teeth, and a spring holding the teeth of the pivoted dog normally in engagement with the rack-teeth.

In testimony whereof I have hereunto set my hand in presence of two subscribing witnesses.

JAMES P. RAY.

Witnesses:
EDWARD TAGGART,
MARY S. TOOKER.